(12) United States Patent
Meacham

(10) Patent No.: US 9,715,117 B2
(45) Date of Patent: Jul. 25, 2017

(54) AUTOSTEREOSCOPIC THREE DIMENSIONAL DISPLAY

(71) Applicant: G. B. Kirby Meacham, Shaker Heights, OH (US)

(72) Inventor: G. B. Kirby Meacham, Shaker Heights, OH (US)

(*) Notice: Subject to any disclaimer, the term of this patent is extended or adjusted under 35 U.S.C. 154(b) by 134 days.

(21) Appl. No.: 14/696,403

(22) PCT Filed: Oct. 28, 2013

(86) PCT No.: PCT/US2013/067023
§ 371 (c)(1),
(2) Date: Apr. 25, 2015

(87) PCT Pub. No.: WO2014/070641
PCT Pub. Date: May 8, 2014

(65) Prior Publication Data
US 2015/0370080 A1    Dec. 24, 2015

Related U.S. Application Data

(60) Provisional application No. 61/795,989, filed on Oct. 31, 2012.

(51) Int. Cl.
| | |
|---|---|
| *G03B 21/625* | (2014.01) |
| *G02B 27/22* | (2006.01) |
| *G03B 21/14* | (2006.01) |
| *G03B 21/60* | (2014.01) |
| *G02B 5/04* | (2006.01) |
| *G03B 21/602* | (2014.01) |
| *G03B 21/606* | (2014.01) |

(52) U.S. Cl.
CPC .......... *G02B 27/2214* (2013.01); *G02B 5/045* (2013.01); *G02B 27/225* (2013.01); *G03B 21/147* (2013.01); *G03B 21/60* (2013.01); *G03B 21/602* (2013.01); *G03B 21/606* (2013.01); *G03B 21/625* (2013.01)

(58) Field of Classification Search
CPC ........ G03B 21/56; G03B 21/62; G03B 21/64; G03B 21/625; G02B 27/144; G02B 27/285
See application file for complete search history.

(56) References Cited

U.S. PATENT DOCUMENTS

| | | | | |
|---|---|---|---|---|
| 4,436,392 A | * | 3/1984 | Vanderwerf | G03B 21/132 353/102 |
| 5,504,544 A | * | 4/1996 | Dreyer | G02B 5/04 353/38 |
| 6,031,664 A | * | 2/2000 | Goto | G03B 21/625 359/456 |
| 2011/0261327 A1 | * | 10/2011 | Endo | G02B 5/0231 353/38 |

* cited by examiner

*Primary Examiner* — Sultan Chowdhury

(57) ABSTRACT

The present invention is an improvement in glasses-free autostereoscopic three dimensional image viewing systems. In particular, it comprises transmissive front projection and reflective rear projection screens with high optical efficiency and precision that facilitate the use of multiple low-cost digital projectors to display multiple perspective views of the displayed scene in well defined virtual apertures in the viewing region. In certain applications the invention facilitates indefinitely wide three dimensional displays that accommodate large groups of observers.

18 Claims, 16 Drawing Sheets

AUTOSTEREOSCOPIC THREE DIMENSIONAL DISPLAY

This application claims the priority of U.S. provisional application 61/795,989.

FIELD OF THE INVENTION

The present invention is related to projection screens that direct and confine multiple optically projected images to multiple virtual apertures in the observer's vicinity, such that the observer sees different images when looking through different virtual apertures at different locations. More particularly, it is related to autostereoscopic three dimensional systems including image projectors and projection screens for displaying stereoscopic images that may be viewed directly without glasses or similar viewing aids, wherein stereoscopically related images are channeled to each of the observer's eyes when each eye is looking through a different virtual aperture. Further, the present invention relates to both front and rear projection systems.

BACKGROUND OF THE INVENTION

Stereoscopic display of visual scenes requires that a separate two-dimensional image be supplied to each eye of the observer, wherein each image is a member of a stereo pair that depicts the scene from a different perspective viewpoint. The observer's visual system fuses the images, providing a realistic three dimensional impression. Many known systems require the observer to wear glasses, goggles or similar devices to supply separate images to each eye. For many applications, however, such devices are inconvenient or impractical.

In contrast, an autostereoscopic three dimensional display directs a separate two-dimensional image to each eye of the observer without requiring the observer to wear any device. An optical system superimposes the two-dimensional images on a viewing plane, while limiting the viewing zone of each image to a separate exit pupil or virtual aperture in the vicinity of the observer's eyes. The virtual aperture size, shape and position are controlled so that each eye looks into a different virtual aperture and sees a different two-dimensional image. This approach works with as few as two virtual apertures and two views, but in this case the observer must seek out the position where each eye is looking through the correct virtual aperture. A side-by-side array of multiple virtual apertures provides more freedom for the observer to move around while continuing to view the scene. So long as each virtual aperture is narrower than the observer's interocular separation and each adjacent pair of virtual apertures shows stereoscopically related perspective views of the scene, the observer will perceive a realistic three dimensional impression of the scene when both eyes are positioned within the array. Further, when the observer moves side-to-side within the array, his eyes will transition from view to view and he will experience a life-like change in the scene perspective. A wide array of multiple virtual apertures also allows multiple observers to view the same scene. Alternatively, each observer may be shown a different scene in applications such as video games. In all cases the systems are very intuitive to use: the observers simply approach the screen and perceive a 3-D image when they are in position to look through the virtual aperture array.

The present invention relates to the class of autostereoscopic display systems in which multiple projectors, particularly video projectors, superimpose multiple perspective views of the scene onto either a transmissive rear projection screen or a reflective front projection optical screen that directs light to form an array of virtual apertures, wherein a different perspective view is visible through each virtual aperture, but invisible elsewhere in the viewing area. Each individual projector in such systems can be of common and readily available frame-rate, resolution and light output, since the multiple image formation task is distributed over all the projectors. In contrast, some prior art autostereoscopic systems rely on a single specialized display device with very high frame-rate or very high resolution to form the required multiple images. Ongoing reductions in the size, cost and energy consumption of commonly available video projectors, exemplified by picoprojectors small enough and low enough in cost to be integrated into cellular telephones, make autostereoscopic systems incorporating multiple projectors an increasingly attractive approach.

Prior art front and rear projection optical screens to form virtual apertures, however, are problematic. The projectors form superimposed real images on the screen, and the function of the screen is to redirect each point of projector light focused on the screen so that it is evenly distributed over the associated virtual aperture, and excluded from other areas. The most efficient approach is to direct all the light to the virtual apertures, while approaches that block light are less efficient and require higher output projectors. Screens comprising a Fresnel lens collect light efficiently from multiple projectors over the screen area, and direct the light from each projector to a separate small area. Each small area is a real image of the lens exit pupil that forms a "peephole" virtual aperture through which the projected image from the associated projector is visible, and the projected image is invisible elsewhere. The "peepholes" require exact eye positioning, and are therefore not acceptable for most applications. Anisotropic diffusion means such as a pair of lenticular screens have been proposed in the prior art to expand the virtual apertures in the horizontal and vertical directions to increase the range of eye positions in which the image is visible. This expanding means is reported to be effective in the vertical direction where a large and relatively imprecise amount of scattering is acceptable, but providing a small but well-controlled amount of dispersion in the horizontal direction appears to be more difficult since the Gaussian nature of the diffusion causes non-uniform illumination across the virtual apertures and excessive double imaging at the edges of the apertures.

Double-sided refractive lenticular screens with a transmissive diffusion layer in-between have been proposed for rear projection autostereoscopic systems. Precise alignment of the front and rear lenticular features is critical and reportedly difficult. Single-sided refractive lenticular screens backed by a reflective diffusion layer avoid the need for alignment, but show cross-talk between virtual apertures caused by scattering. Slit mask screens that block light to form virtual apertures have similar difficulties, with the added disadvantage of poor luminous efficiency.

Fresnel lens screens used with projector lens apertures enlarged in diameter to the point that adjacent lens aperture edges adjoin have been proposed to increase the width of the virtual apertures and minimize the requirement for expansion by horizontal diffusion. The virtual apertures are further expanded in the vertical direction using single-direction diffusers such as lenticular screens. Special lenses have been described to accomplish this. Alternatively, projectors with large but more conventional lenses may be staggered up and down to achieve a similar effect. Drawbacks include large and sometimes complex projector lenses.

A need clearly exists for a multiple projector autostereoscopic system incorporating front or rear projection optical screens that precisely and efficiently direct the projector light to the virtual aperture array without depending on diffusion, and that can accommodate small projector apertures.

SUMMARY OF THE INVENTION

The present invention is an improvement in glasses-free autostereoscopic three dimensional image viewing systems. It comprises passive optical screen configurations that direct the light from multiple projectors focused on the screen into specified virtual apertures formed on a plane in the viewing region that is parallel to the screen. The screens are translucent sheets with optical elements formed on both surfaces. The optical elements on the first surface form a vertical Fresnel-like prism array, and on the second surface form a horizontal Fresnel-like linear prism array, where the prisms are configured to emulate cylindrical lenses with long positive focal lengths. Transmissive rear projection screens comprise refractive optical elements on both surfaces, while reflective front projection screens comprise refractive optical elements on the front surface and reflective optical elements on the rear surface. Each prism is an optical element that directs projector light to the centers of the virtual apertures. Unlike conventional Fresnel lenses, each prism face has a cylindrical surface that forms a negative short focal length optical element to increase the angular dispersion of the light passing through the prism so that it fills in the virtual apertures. is difficult since the Gaussian nature of the diffusion causes non-uniform illumination across the virtual apertures and double imaging at the edges of the apertures.

The vertical prisms have relatively weak short focus negative optical elements to form the relatively narrow width of the virtual apertures, and the horizontal prisms have stronger short focus negative optical elements to form the larger height of the virtual apertures. The two prism arrays in combination direct light into high, narrow virtual apertures in the observer's space. Alternatively, short focus positive optical elements may be used to achieve a similar result.

The optical screens of this invention have functional advantages compared to the prior art. The light angular divergence required to fill the virtual apertures is provided by refraction or reflection which provides more uniform illumination and more precise and sharper edge cutoff than Gaussian diffusers. This is a result of the fact that the divergence is determined by the focal length and width of the short focus optical element, rather than the random multiple refractions and reflections of diffusion. This allows small, separated projector lenses to effectively fill the virtual apertures in the horizontal direction, eliminating any need for large projector apertures or special lenses. Projector light output requirements are minimized, since light absorption and scattering are low and the light is directed only to the viewing area.

The optical screens of this invention also have economic and practical advantages compared to the prior art. Linear Fresnel-like lens arrays have moderate tooling costs, and may be produced from plastic sheet by simple manufacturing processes such as hot-pressing, embossing, extrusion or roll forming and then bonded together to form complete screens. Since the front and rear screen optical arrays are orthogonal, precise alignment of bonded sheets is not needed to provide good performance or avoid moiré patterns. These factors lead to low screen production cost.

Both front and rear projection implementations of the optical screen of the invention can be applied to three variations of multiple projector autostereoscopic display systems. The first uses "integral" two dimensional images, wherein each projector displays a complete image of the scene from a given perspective view. Each projector is adjusted using lateral lens shift to superimpose the images on the screen, and the screen prisms direct the light from each projector to its separate virtual aperture. The vertical and horizontal Fresnel-like prisms of a screen adapted to integral image systems have similar long cylindrical focal lengths that form real images of the projector exit pupils at the virtual aperture plane. An integral image application can use two to perhaps a dozen or more projectors and views before off-axis optical effects from the lateral lens shift degrade the image in the extreme left and right views. It is likely best suited for display applications that require a modest viewing zone to serve one observer or a small group of observers.

The second application uses "composite" two dimensional images in which each projector displays multiple vertical image stripes, where each stripe is an image of the same portion of the scene from a different perspective viewpoint. The projectors all have centered lenses and project straight-ahead and focus on the screen. The screen prisms direct the light from each image strip in each projector to a separate virtual aperture, such that each virtual aperture accesses a composite view of the scene from one perspective viewpoint formed from image stripes from different projectors joined edge-to-edge. The horizontal Fresnel-like prisms of a screen adapted to composite image systems have a long cylindrical focal length that forms real images of the projector exit pupils at the virtual aperture plane. The vertical prisms have an infinite focal length and disappear, leaving only the vertically oriented array of relatively weak negative lens surfaces. A composite image application requires a minimum of perhaps a dozen projectors, but can be extended to an indefinite number of projectors to provide an arbitrarily wide viewing zone. This is possible since all the projectors point straight-ahead and thereby avoid off-axis effects. The number of perspective views displayed by any one projector may be less than the total number of projectors in the system, although the total number of perspective views is similar to the total number of projectors. The projectors near the observer's position only need to display the views appropriate to this position: the observer can see more views by changing position. The composite image application is well adapted to displays serving groups of people.

The third application combines aspects of the first two applications, using integral two dimensional images with a front projection screen that incorporates retroreflectors. It employs an array of projectors ranging from a minimum of two to an indefinitely large number serving a wide viewing zone. Each projector displays an integral image of the scene from a given perspective view. The projectors all have centered lenses and project straight-ahead and focus on the screen. An array of vertical retroreflective prisms forming the rear surface of the screen directs the light from each projector in the horizontal direction back to a virtual aperture at the horizontal position of the projector lens, such that each virtual aperture accesses an two dimensional integral image of the scene from one perspective viewpoint. The vertical retroreflective prism faces comprise relatively weak short focus optical elements to form the relatively narrow width of the virtual apertures. The transparent horizontal Fresnel-like prisms forming the front surface of a screen adapted to retroreflector systems have a long cylindrical focal length that forms real images of the projector exit pupils at the virtual aperture plane, wherein the prism faces comprise relatively strong short focus optical elements to form the relatively large height of the virtual apertures. The retroreflective integral image application may be adapted to displays serving individuals or groups of people, but is limited to front projection.

BRIEF DESCRIPTION OF THE DRAWINGS

In the drawings, in which like reference numbers indicate corresponding parts throughout the several views.

DETAILED DESCRIPTION OF THE PREFERRED EMBODIMENTS

In the following description and claims it is understood that the terms "cylindrical" and "plane or planar" are used in a general, not a strict sense. "Cylindrical" lenses, for example, may incorporate known aspheric design features to reduce aberrations. Similarly, "planar" screens may have curvature to provide displays forming curved viewing surfaces. Further, projectors with planar image forming surfaces and projection lenses are used to illustrate the optical principles of the screen. Other projector types such as scanning laser projectors are equally applicable, and may have advantages such as being focus-free and capable of distortion correction both optically and in software.

Figure 1:
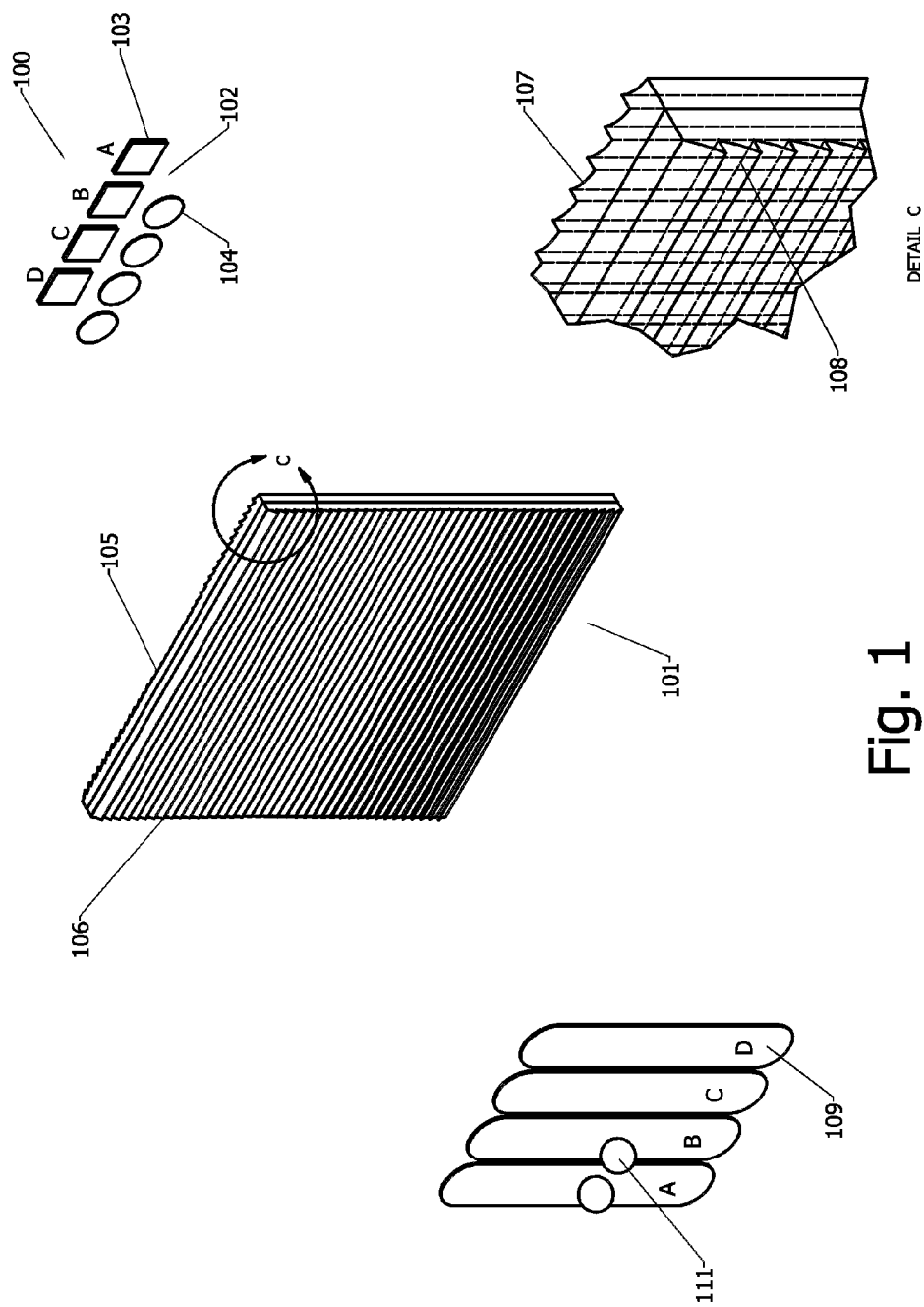
FIG. 1 is a perspective view of the rear projection integral image application of the autostereoscopic display system.
Figure 2:
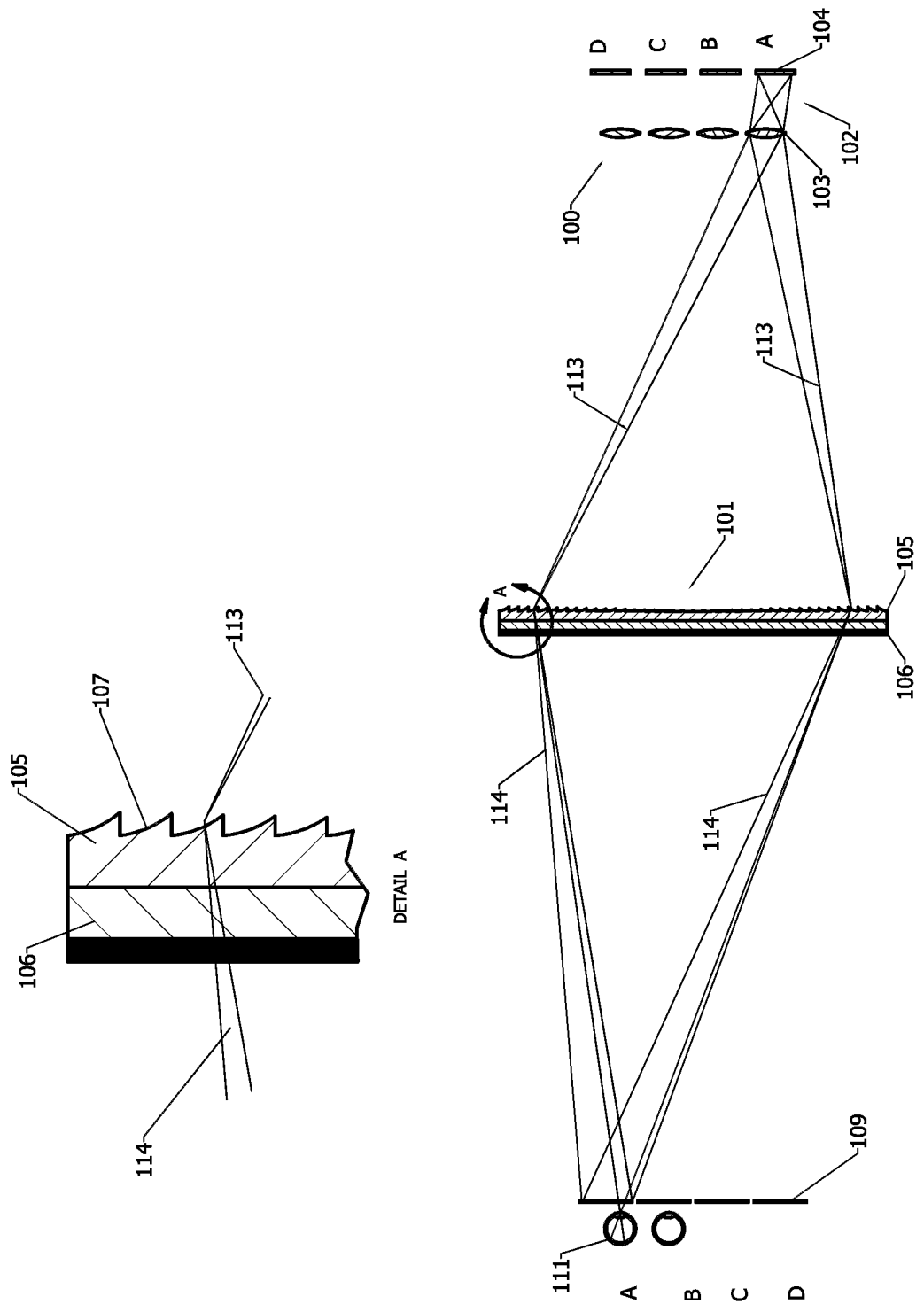
FIG. 2 is a sectional plan view of the rear projection integral image application of the autostereoscopic display system.
Figure 3:
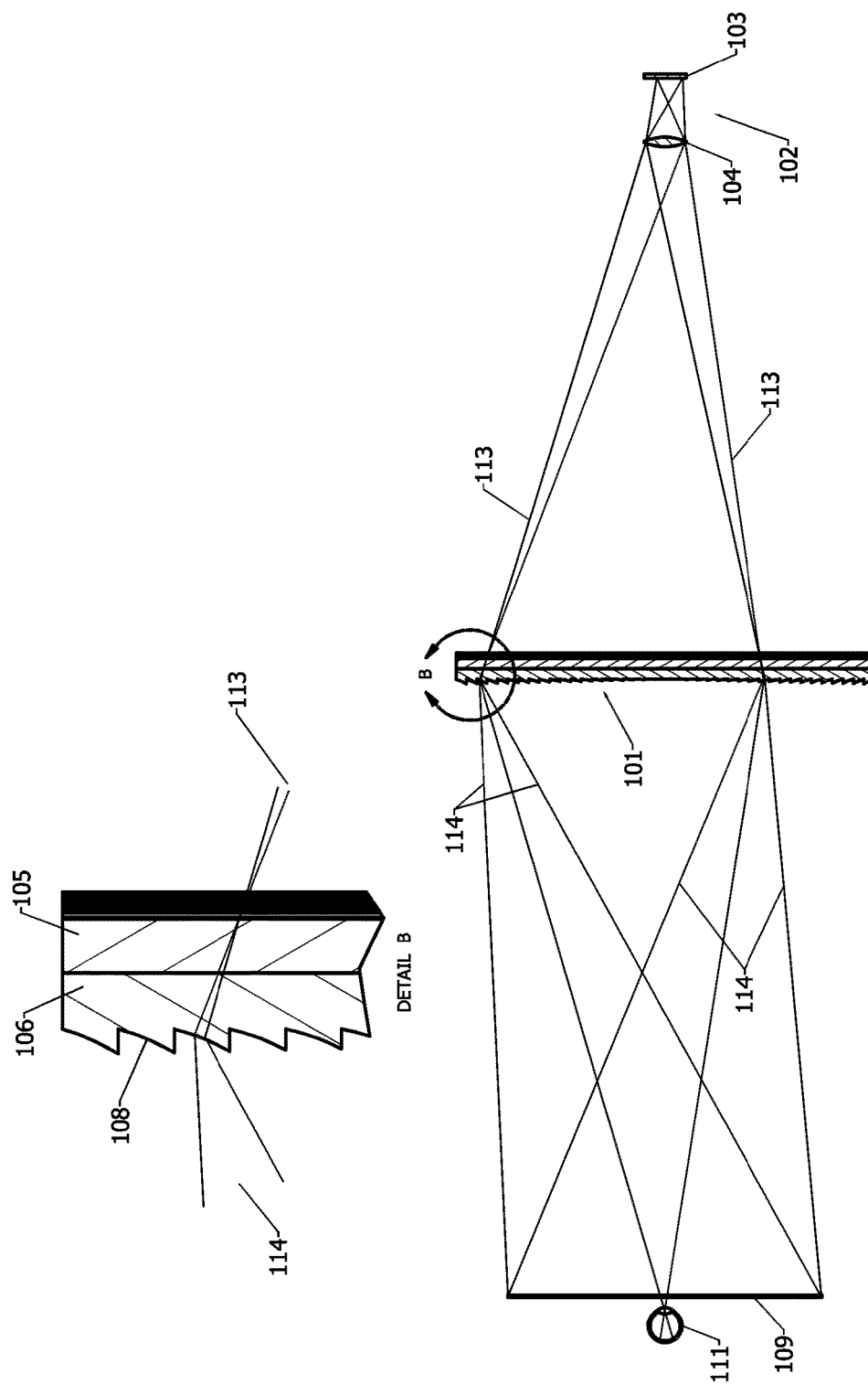
FIG. 3 is a sectional side elevation of the rear projection integral image application of the autostereoscopic display system.

In the rear projection integral image application of the invention shown in FIG. 1, FIG. 2 and FIG. 3, a multiple projector array 100 is positioned behind an optical screen 101. Each projector 102 comprises an illuminated two dimensional image plane 103 and a projection lens 104. The image planes 103 are coplanar and parallel to the screen 101. The lenses 104 are adjusted such that the illuminated images on the image planes 103 are projected as superimposed real images on the screen 101. The adjustments include positioning the lenses 104 laterally to bring all the real images on screen 101 into register with each other while maintaining sharp focus and avoiding image distortion. The screen 101 is formed of a vertical Fresnel-like prism array 105 superimposed on a horizontal Fresnel-like linear prism array 106, where each vertical prism face 107 and horizontal prism face 108 has a concave surface that forms a short focus negative cylindrical lens surface. The vertical prism surfaces 107 have relatively weak negative focusing strength, and the horizontal prism surfaces 108 have stronger negative focusing strength. The vertical prism array 106 and the horizontal prism array 107 of a screen adapted to integral image systems have similar long cylindrical focal lengths that form real images of the projector exit pupils centered within each virtual aperture 109. The spacing of projectors 102 in projector array 100 is set to produce virtual aperture spacing less than the interocular spacing of the observers. Incoming light rays 113 from the projectors 102 converge to a real image focus at the plane of the screen 101 as illustrated in FIG. 2 and FIG. 3. As shown in FIG. 2, the angles of the vertical prism surfaces 107 are set to refract the incoming light rays 113 in the horizontal direction to form outgoing light rays 114 directed to the center of the corresponding virtual aperture 109, while the relatively weak negative short focus cylindrical lens surfaces comprising the prism surfaces 107 expands the divergence of the outgoing light rays in the horizontal direction to fill the width of the virtual apertures 109. Similarly as shown in FIG. 3, the angles of the horizontal prism surfaces 108 are set to refract the incoming light rays 113 in the vertical direction to form outgoing light rays 114 directed to the center of the corresponding virtual aperture 109, while the relatively strong short focus negative cylindrical lens surfaces comprising the horizontal prism surfaces 108 increase the divergence of the outgoing light rays in the vertical direction to fill the height of the virtual apertures 109. The two prism arrays in combination thereby form high, narrow virtual apertures 109 on a plane in the observer's space, where the plane is generally parallel to the screen 101. The virtual apertures are uniformly illuminated with well-defined edges since the divergence is determined by the focal length and width of the short focus optical elements.

When the observer positions an eye 111 to look through a given virtual aperture 109, the eye sees an integral view image from only one projector 102. If each eye is looking through different adjacent virtual apertures, each sees an integral view image from a different projector. The perspective difference between the two view images provides the stereoscopic depth cues to provide binocular depth perception of the subject. Further, lateral head movement results in transition from virtual aperture to virtual aperture, and a resulting perspective change that provides a look-around effect. A four projector array 100 and four virtual apertures 109 are shown, but a larger number may be used to increase the size of the viewing zone in the observer's space. The upper limit is set by the off-axis performance of the projectors 102 and the optical elements of screen 101. Alternatively, as few as two projectors and virtual apertures can provide an autostereoscopic view of a scene in a limited viewing zone.

Figure 4:
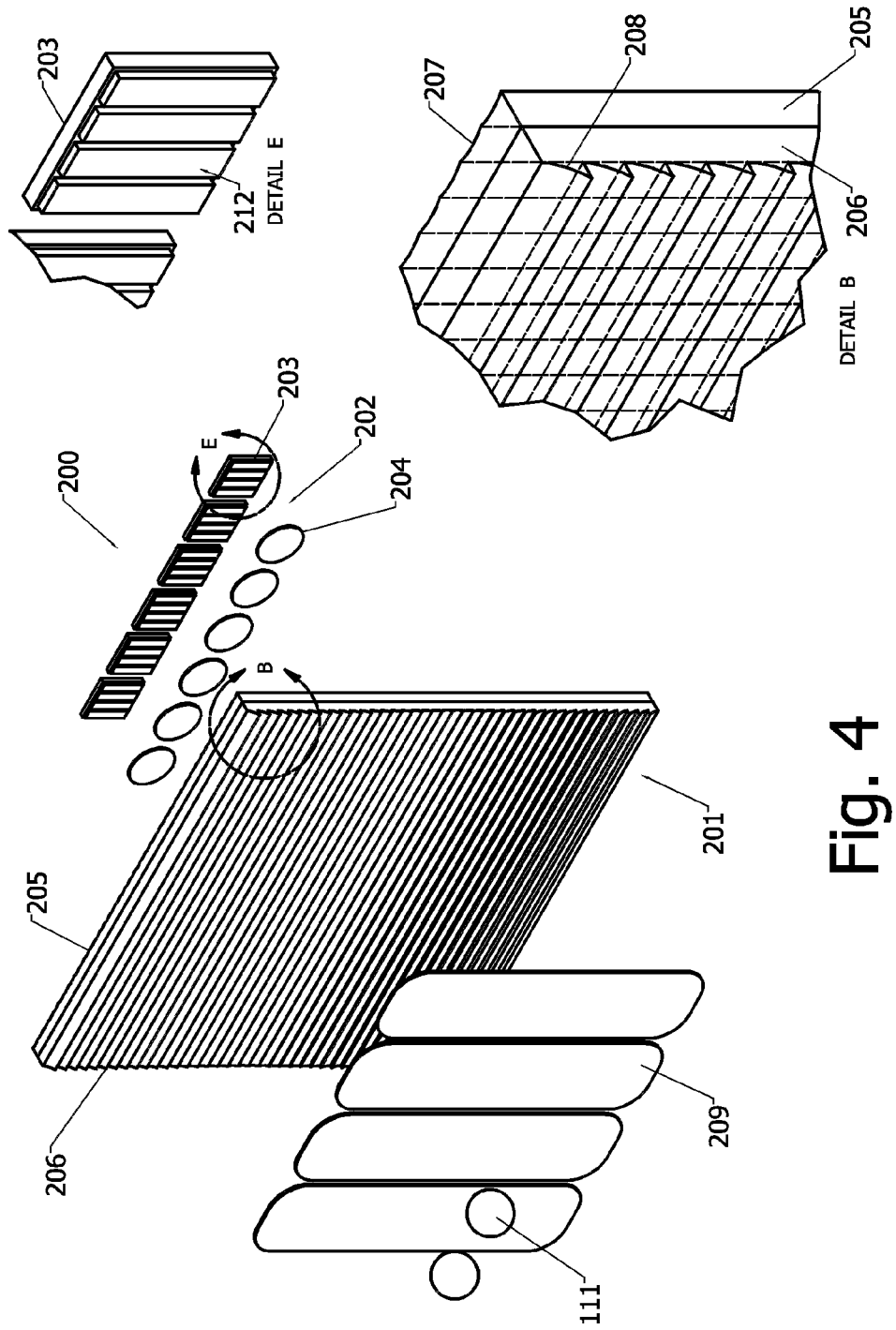
FIG. 4 is a perspective view of the rear projection composite image application of the autostereoscopic display system.
Figure 5:
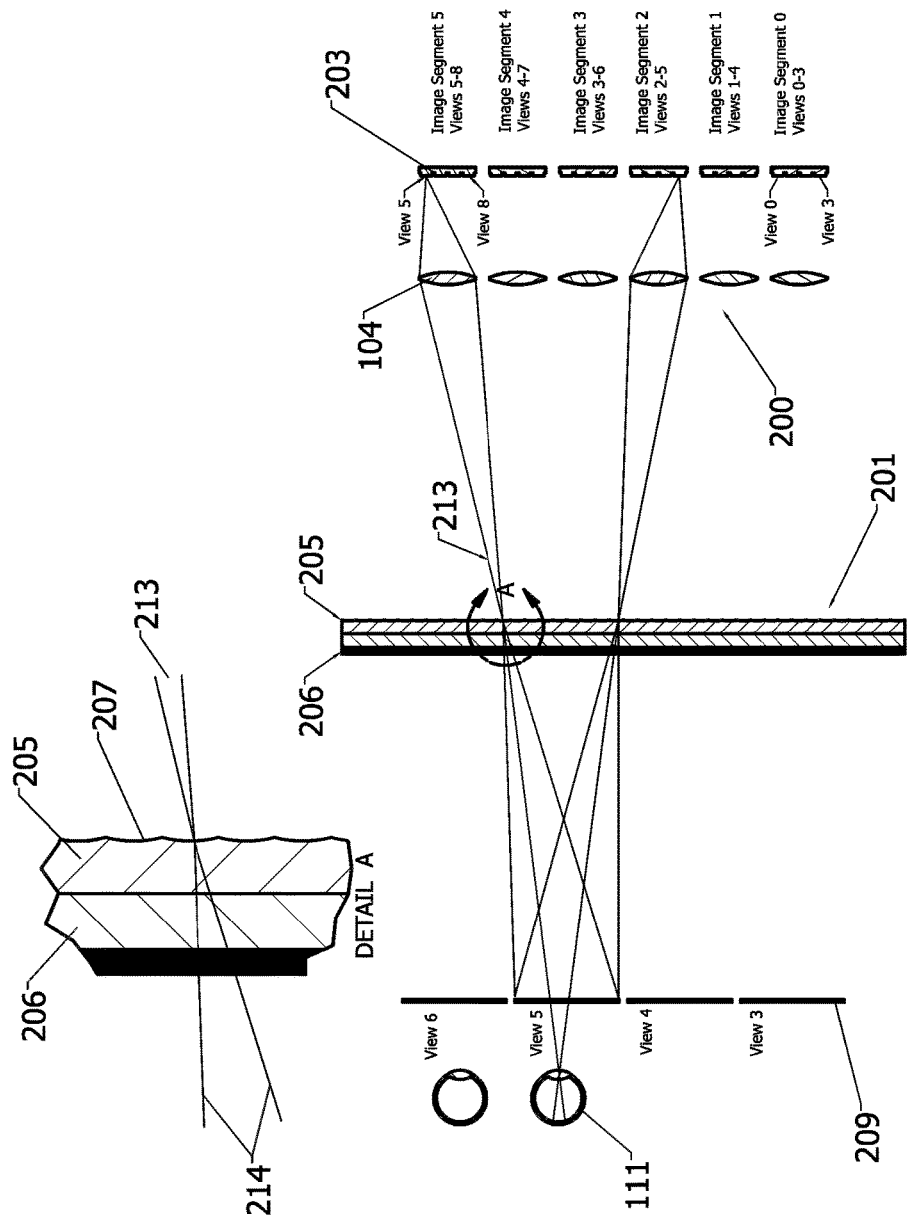
FIG. 5 is a sectional plan view of the rear projection composite image application of the autostereoscopic display system.
Figure 6:
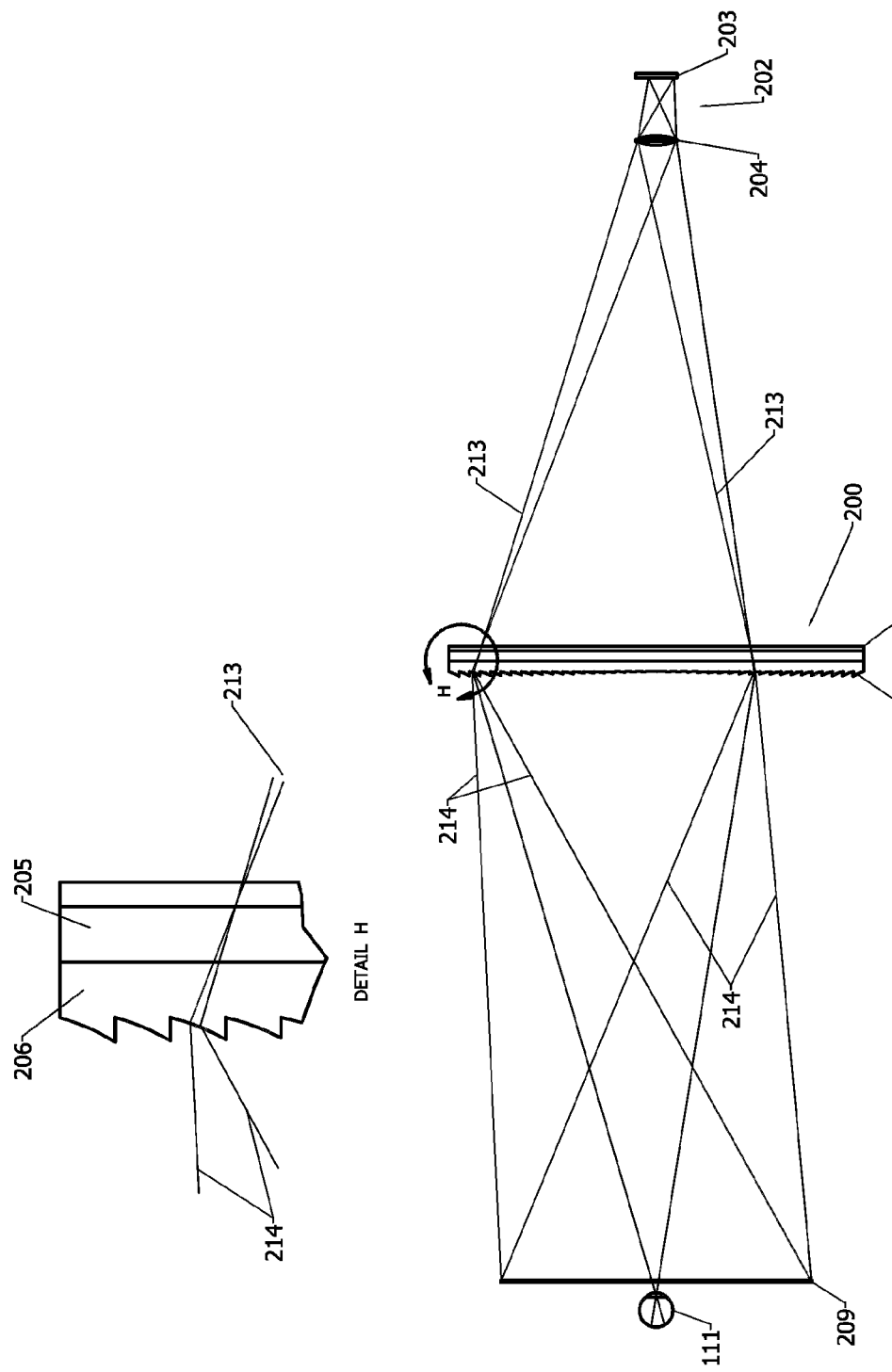
FIG. 6 is a side elevation of the rear projection composite image application of the autostereoscopic display system.

In the rear projection composite image application of the invention shown in FIG. 4, FIG. 5 and FIG. 6, a multiple projector array 200 is positioned behind an optical screen 201. Each projector 202 comprises an illuminated two dimensional image plane 203 and a projection lens 104. The image planes 203 are coplanar and parallel to the screen 201. Each image plane 203 displays vertical stripe-like segments 212 of the scene. The segments 212 in any given projector 202 all depict the same section of the scene, but each from a different perspective viewpoint. The screen 201 is formed of a vertical linear lenticle array 205 superimposed on a horizontal prism array 206. Each lenticle in array 205 has a concave surface 207 that forms a weak negative short focus cylindrical lens surface. The horizontal Fresnel-like prism array 206 directs light toward the center of the virtual apertures 209, wherein each horizontal prism face 208 has a concave surface that forms a strong short focus negative cylindrical lens surface. Incoming light rays 213 from the projectors 202 converge to a real image focus at the plane of the screen 201 as illustrated in FIG. 5 and FIG. 6. As shown in FIG. 5, the relatively weak negative lenticles of array 205 refract and spread the incoming light rays 213 so the outgoing light rays 214 diverge to fill the width of the corresponding virtual aperture 209 but do not change the overall direction of the rays. As shown in FIG. 6, the angles of the horizontal prism surfaces 208 are set to refract the incoming light rays 213 in the vertical direction to form outgoing light rays 214 directed toward the center of virtual aperture 209 to form real images of the projector exit pupils centered within each the virtual apertures 209, while the relatively strong short focus negative lens surfaces comprising the horizontal prism surfaces 208 expand the divergence of the outgoing light rays in the vertical direction to fill the height of the virtual apertures 209. The vertical negative linear lenticle array 205 has no overall light directing power, and may be considered a Fresnel-like prism array with infinite focal length having negative short focus cylindrical lens surfaces 207 on each prism face. The two linear optical arrays comprising screen 201 thereby in combination form high, narrow virtual apertures 209 on a plane in the observer's space, where the plane is generally parallel to the screen 201. The virtual apertures are uniformly illuminated with well-defined edges since the divergence is determined by the focal length and width of the short focus optical elements.

The lenses 104 are adjusted such that the illuminated images on the image planes 203 are projected straight-ahead as superimposed real images on the screen 201. The center-to-center spacing of the projectors 202 in the projector array 200 is set to be approximately equal to the width of the virtual apertures 209, e.g. about 50 millimeters. The focal length of the projector lenses 104 and the width of the multiple perspective view image segments 212 on the illuminated image planes 203 are set such that light rays from the centers of any two adjacent image segments 212 in each projector 202 pass through the screen 210 and the centers of the corresponding adjacent virtual apertures 209. The result is that the distance between the plane of the screen 201 and the plane of the virtual apertures 209 is approximately equal to the distance between the screen plane and the projector array 201. It should be noted that the projectors 202 focus to form a real image on the plane of screen 201, not the plane of the virtual apertures 209. An observer looking through the virtual apertures 209 focuses on the plane of screen 201 to see the projected real images.

The example shown in FIG. 4, FIG. 5 and FIG. 6 shows six projectors 202, each projecting vertical stripes 212 comprising a subset of four out of a total of nine perspective views. The perspective views shown by each projector 202 are a function of the projector position, and the observer's eye 111 sees a composite view four vertical stripes wide through a virtual aperture 209, wherein the four stripes come from the four projectors 202 nearest this virtual aperture. This scheme can be extended indefinitely by increasing the number of projectors 202 in projector array 200 and the width of screen 201 to accommodate a number of observers or viewpoints. The screens 201 may also be curved in the concave or convex directions and extended to the limit of forming circular display walls. The horizontal extent of the subject image that can be seen from any one position is a function of the angular coverage of the projectors, which is in turn controlled by the off-axis performance of the optics and the number of multiple perspective view image segments 212 displayed on the illuminated image planes 204. Image processing using known techniques is used to convert integral perspective view images of the subject into the perspective view image segments 212 displayed on the illuminated image planes 203.

Without the vertical negative linear lenticle surfaces of lenticle array 205, an observer's eye 111 positioned in a virtual aperture 209 would see four vertical stripes of one perspective view of the subject image with stripe widths approximately the diameter of the lens apertures of projectors 202, separated by dark zones. The perceived stripes are direct partial width views of the illuminated image planes 203 magnified by the projector lenses 204 and expanded vertically by the horizontal prism array 206. Adding the weak negative linear lenticle array 205 causes the light leaving the screen to diverge and expand the horizontal field of view to show the full width of each stripe. This fills in the dark zones so that the stripes join edge to edge and the perceived composite image of one perspective view is complete. If each eye 111 is looking through a different adjacent virtual aperture 209, each sees a different perspective composite view image from a set of five projectors 202, where three of the five projectors are common to the two sets and two are not. The perspective difference between the two composite images provides the stereoscopic depth cues and resulting binocular depth perception of the subject. Further, lateral head movement results in transition of the observer's eyes 111 between virtual apertures 209, and a resulting perspective change that provides a look-around effect.

Front projection screens according to this invention provide the same visual effects as the integral and composite image rear projection screens previously described, similarly using horizontal and vertical prism arrays with negative optical elements on each prism face to direct projector light into virtual apertures on a plane in the viewing zone. Further, composite image front projection systems can also be extended to indefinite width or form concave or convex curved display walls. The principal difference is that the rear prism array is reflective rather than refractive. It is made specularly reflective by known means such as applying a metallic coating to the rear prism surfaces. Projected light rays refract and change direction as they enter the front prisms, change direction again as they reflect from the rear prisms, and refract and change direction again as they leave the front prisms towards the virtual aperture array.

Figure 7:
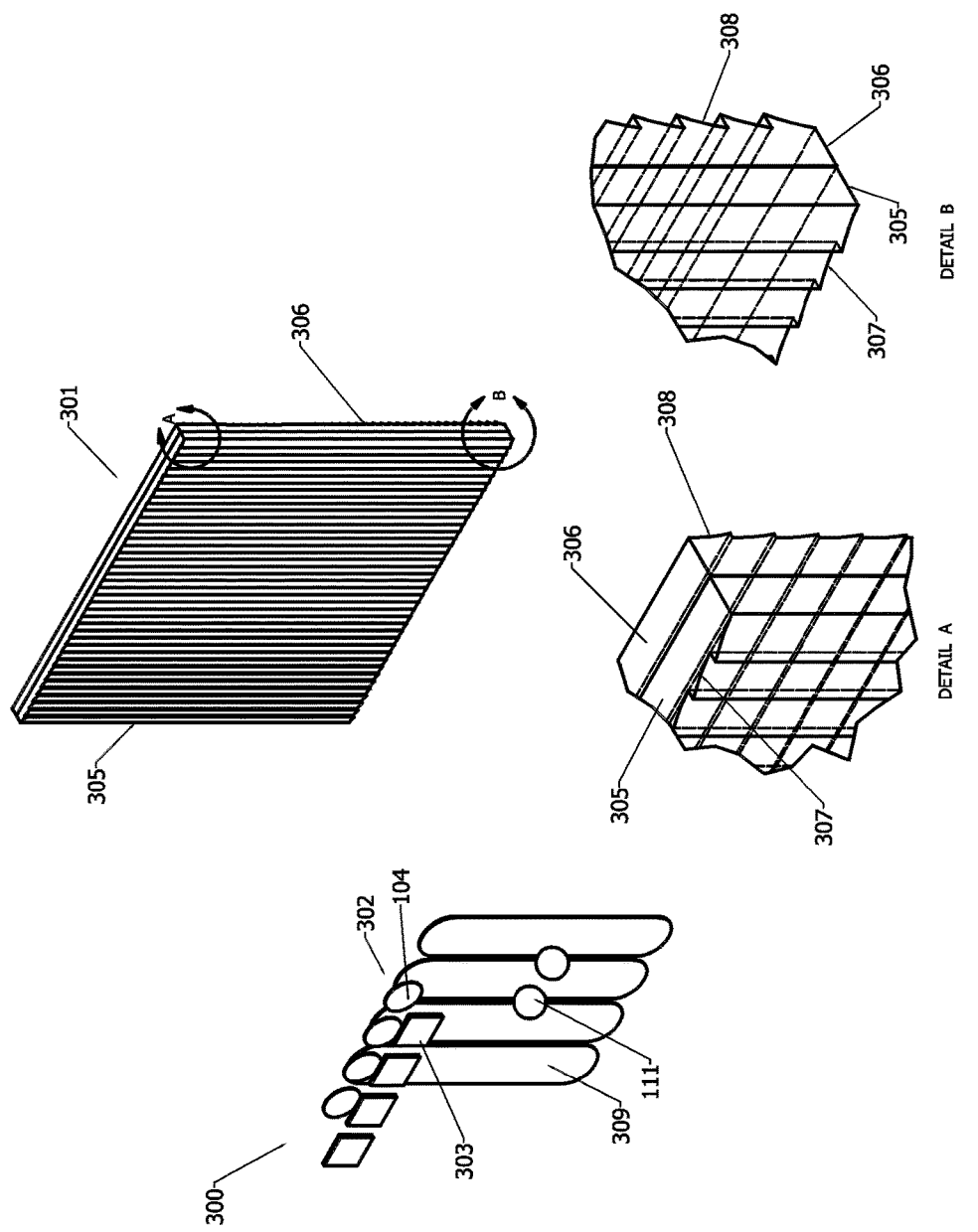
FIG. 7 is a perspective view of the front projection integral image application of the autostereoscopic display system.
Figure 8:
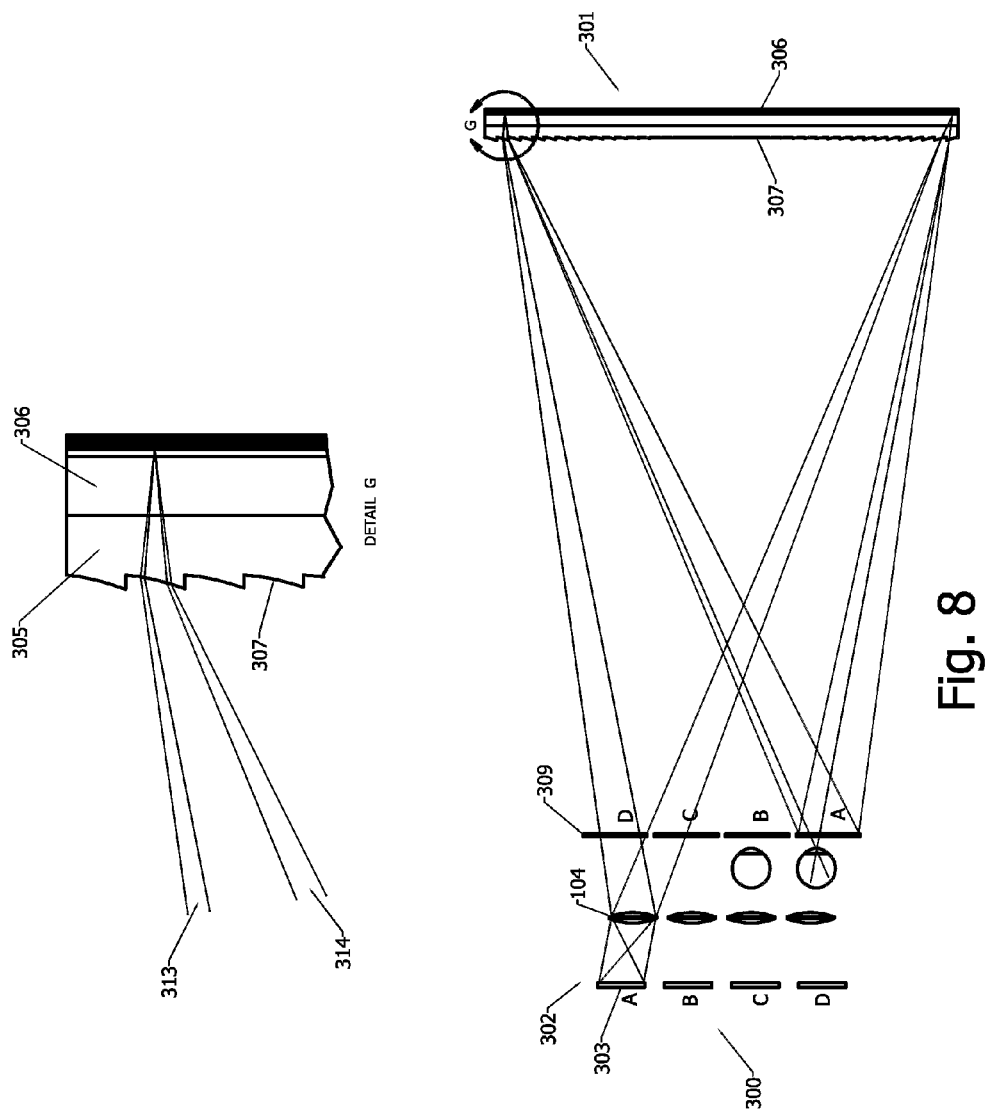
FIG. 8 is a plan view of the front projection integral image application of the autostereoscopic display system.
Figure 9:
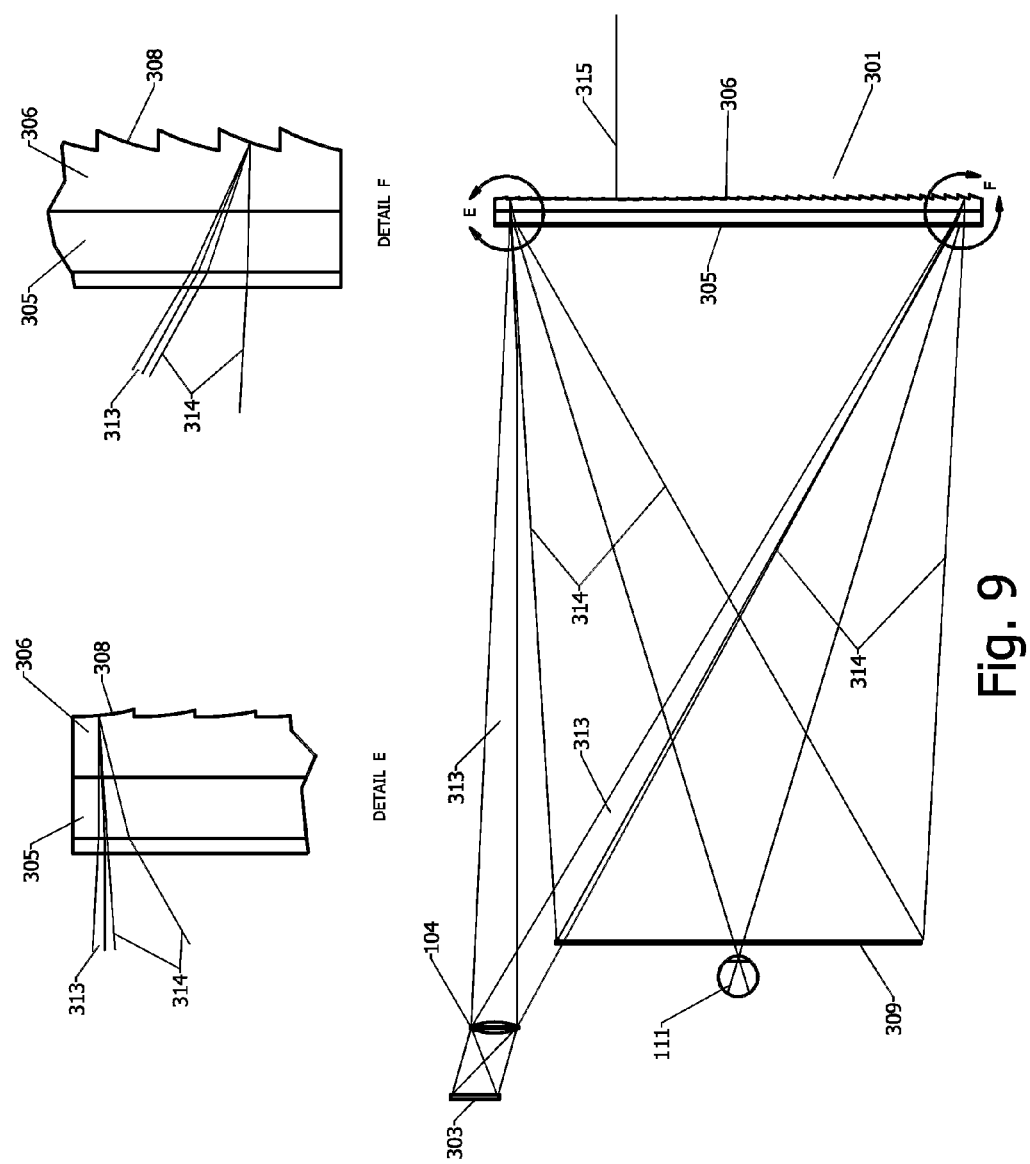
FIG. 9 is a side elevation of the front projection integral image application of the autostereoscopic display system.

A front projection integral image application of the invention is shown in FIG. 7, FIG. 8 and FIG. 9. A multiple projector array 300 is positioned in front of an optical screen 301. Each projector 302 comprises an illuminated two dimensional image plane 103 and a projection lens 104. The image planes 103 are coplanar and parallel to the screen 301. The lenses 104 are adjusted such that the illuminated images on the image planes 103 are projected as superimposed real images on the screen 301. The adjustments include positioning the lenses 104 laterally to bring all the real images on screen 101 into register with each other. Vertical lens shift is also shown to allow the projector array 300 to be positioned above the observers, wherein the lens shift maintains sharp focus and avoids image distortion. The screen 301 is formed of a front vertical Fresnel-like refractive linear prism array 305 superimposed on a rear horizontal Fresnel-like reflective linear prism array 306. The refractive vertical prisms of array 305 and the concave negative lens surfaces 307 each have about half the light deflection values of comparable rear projection screens, since the light passes through the surfaces twice and is refracted twice. The prism faces 308 comprising the reflective horizontal prism array 306 have about the same deflection value as the refractive horizontal prisms of comparable rear projection screens. The reflective prism faces 308 are convex towards the front of the screen to form reflective short focus negative optical elements on each prism. The optical axis 315 of the reflective horizontal prism array 306 is offset upward to match the position of the projector array 300 above the observers and provide more even brightness of screen 301. The vertical refractive prism surfaces 307 have relatively weak negative focusing strength, and the horizontal reflecting prism surfaces 308 have stronger negative focusing strength. The vertical prism array 306 and the horizontal prism array 307 of a screen adapted to integral image systems have similar long cylindrical focal lengths that form real images of the projector exit pupils centered within each virtual aperture 309. The spacing of projectors 302 in projector array 300 is set to produce virtual aperture spacing less than the interocular spacing of the observers. Incoming light rays 313 from the projectors 302 converge to a real image focus at the plane of the screen 301 as illustrated in FIG. 8 and FIG. 9. As shown in FIG. 8, the angles of the vertical prism surfaces 307 are set to refract the incoming light rays 313 in the horizontal direction to form outgoing light rays 314 directed to the center of the corresponding virtual aperture 309, while the relatively weak negative short focus cylindrical lens surfaces comprising the prism surfaces 307 expands the divergence of the outgoing light rays in the horizontal direction to fill the width of the virtual apertures 309. Similarly as shown in FIG. 9, the angles of the horizontal prism surfaces 308 are set to reflect the incoming light rays 313 in the vertical direction to form outgoing light rays 314 directed to the center of the corresponding virtual aperture 309, while the relatively strong short focus negative cylindrical lens surfaces comprising the horizontal prism surfaces 308 increases the divergence of the outgoing light rays in the vertical direction to fill the height of the virtual apertures 309. The two prism arrays in combination thereby form high, narrow virtual apertures 309 on a plane in the observer's space, where the plane is generally parallel to the screen 301. The virtual apertures are uniformly illuminated with well-defined edges since the divergence is determined by the focal length and width of the short focus optical elements.

Figure 10:
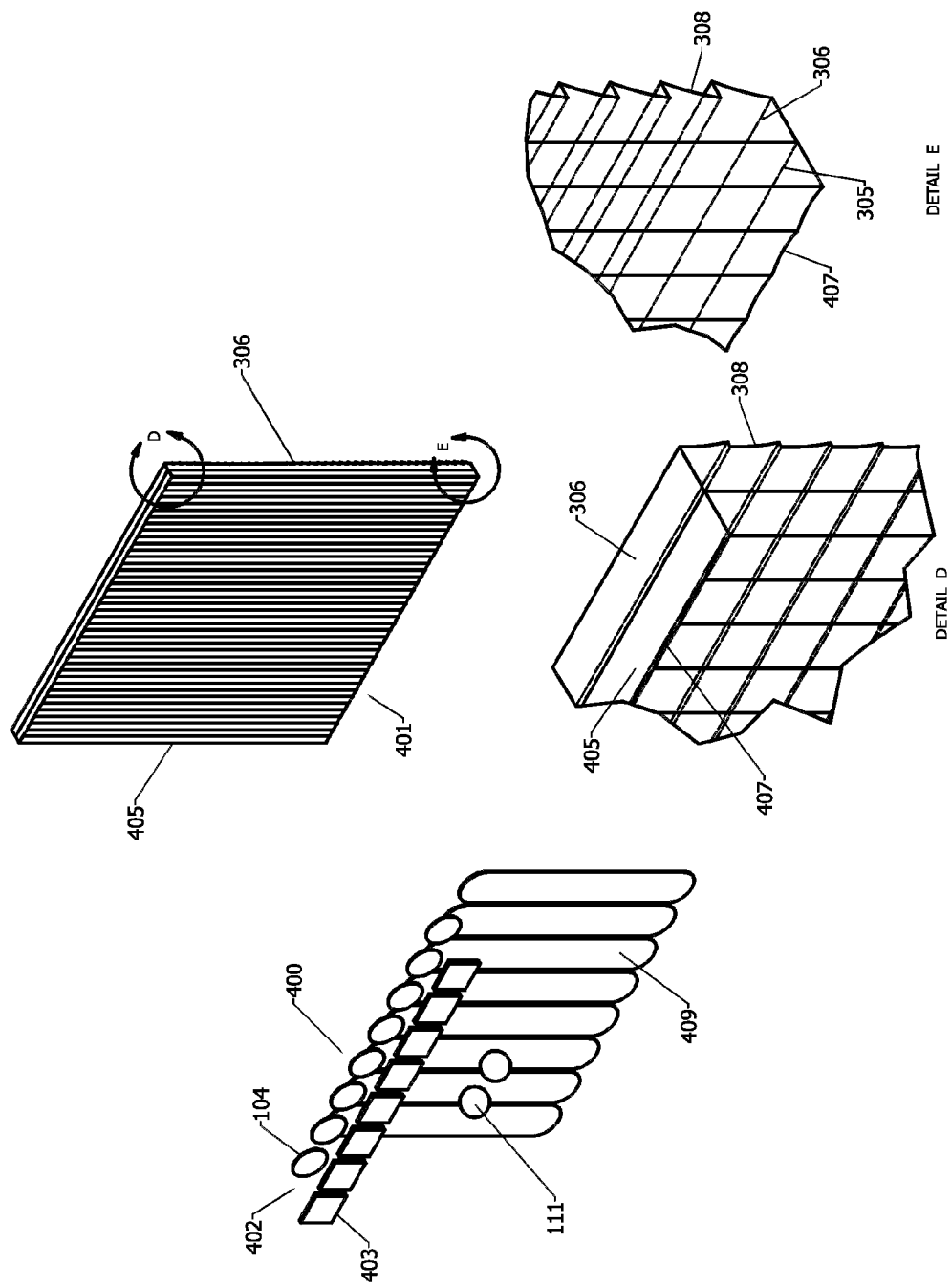
FIG. 10 is a perspective view of the front projection composite image application of the autostereoscopic display system.
Figure 11:
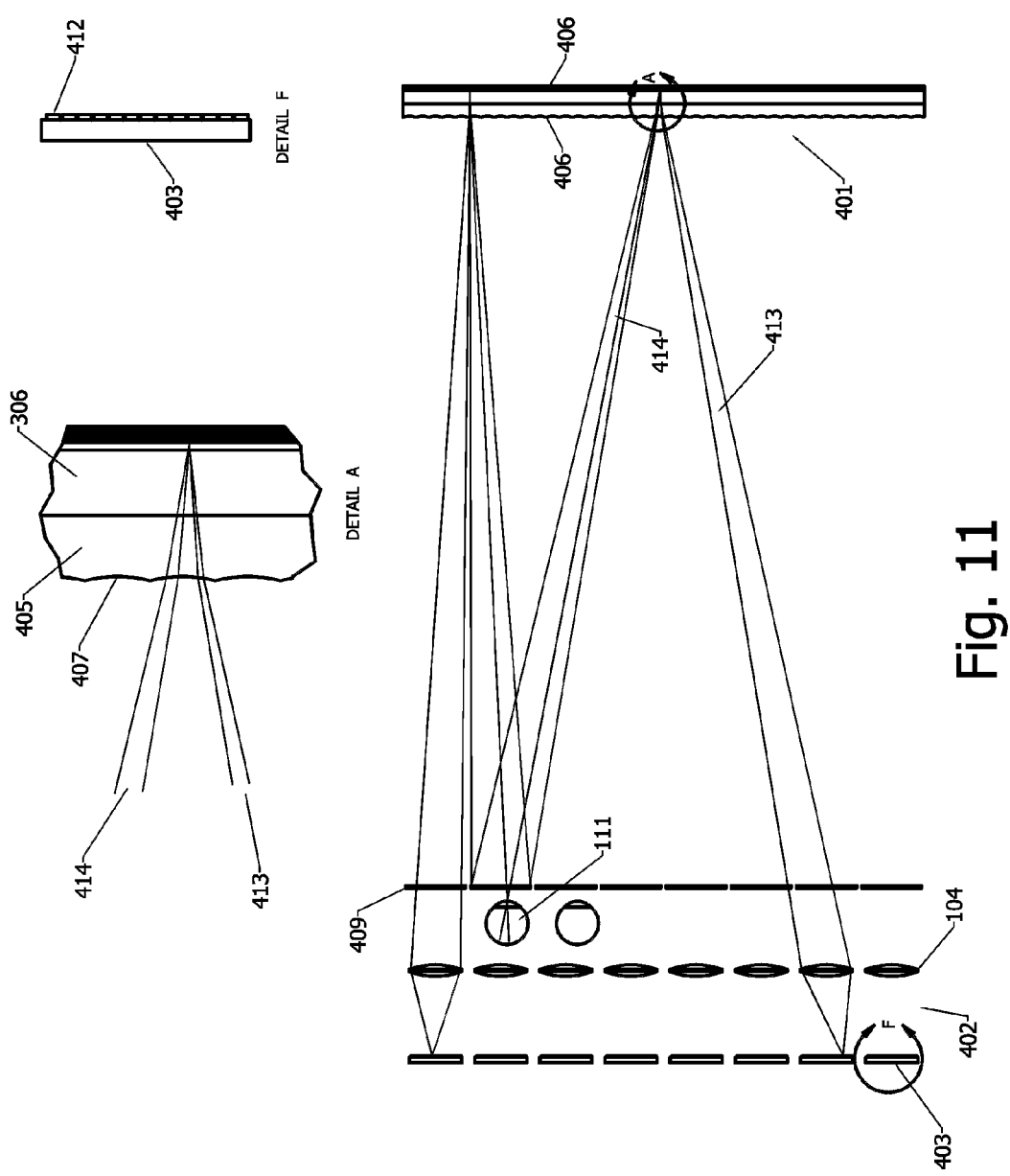
FIG. 11 is a plan view of the front projection composite image application of the autostereoscopic display system.
Figure 12:
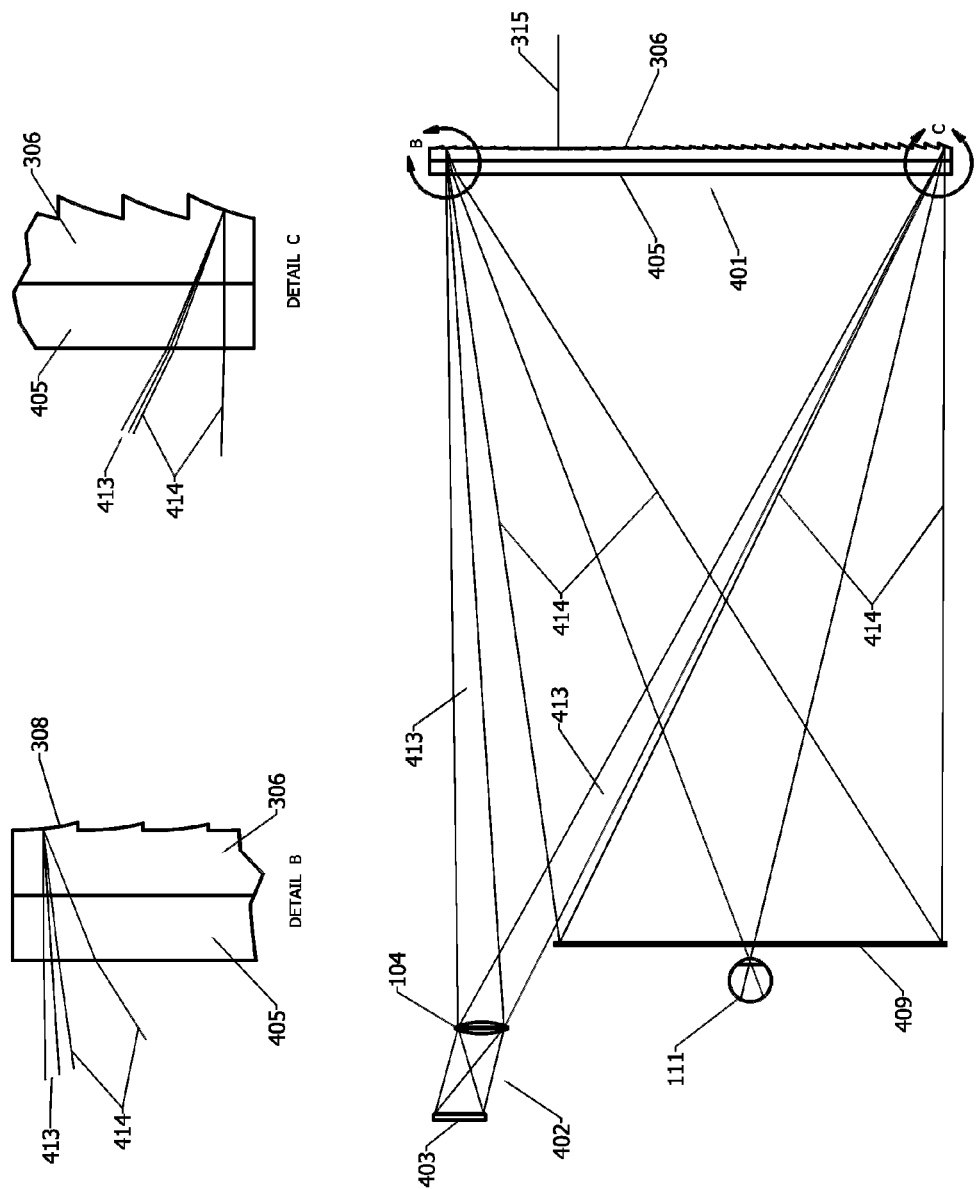
FIG. 12 is a side elevation view of the front projection composite image application of the autostereoscopic display system.

A front projection composite image application of the invention is shown in FIG. 10, FIG. 11 and FIG. 12. A multiple projector array 400 is positioned in front of an optical screen 401. Each projector 402 comprises an illuminated two dimensional image plane 403 and a projection lens 104. Vertical lens shift is also shown that allows the projector array 400 to be positioned above the observers while maintaining sharp focus and avoiding image distortion. The image planes 403 are coplanar and parallel to the screen 401. Each image plane 403 displays vertical stripe-like segments 412 of the scene. The segments 412 in any given projector 402 all depict the same section of the scene but from a different perspective viewpoint. The screen 401 is formed of a vertical negative linear lenticle array 405 superimposed on a rear horizontal Fresnel-like reflective linear prism array 306. The refractive vertical lenticles have concave short focus negative lens surfaces 407 with about half the light deflection values of comparable rear projection screens, since the light passes through the surfaces twice and is refracted twice. The prism faces 308 comprising the reflective horizontal prism array 306 have about the same deflection value as comparable rear projection screens. The reflective prism faces 308 are convex towards the front of the screen to form reflective short focus negative optical elements on each prism. The optical axis 315 of the reflective horizontal prism array 306 is offset upward to match the position of the projector array 400 above the observers and provide more even brightness of screen 401. The negative cylindrical lens surfaces 407 of the vertical negative linear lenticle array 405 have relatively weak negative lens strength, and the horizontal reflecting cylindrical prism surfaces 308 have stronger negative focusing strength. Incoming light rays 413 from the projectors 402 converge to a real image focus at the plane of the screen 401 as illustrated in FIG. 11 and FIG. 12. As shown in FIG. 11, the incoming light rays 413 reflect from the horizontal reflecting prism surfaces 308 to form the outgoing rays 414, such that the horizontal angle of incidence is equal to the horizontal angle of reflectance. The relatively weak short focus negative lenticles of array 405 refract and spread the light so that the outgoing light rays 414 diverge to fill the width of the corresponding virtual aperture 409, but do not change the overall direction of the rays. As shown in FIG. 12, the angles of the horizontal prism surfaces 308 are set to reflect the incoming light rays 413 in the vertical direction to form outgoing light rays 414 directed toward the center of virtual aperture 409 to form real images of the projector exit pupils centered within each of the virtual apertures 409, while the relatively strong short focus negative lens surfaces comprising the horizontal prism surfaces 308 increase the divergence of the outgoing light rays in the vertical direction to fill the height of the virtual apertures 409. The vertical negative linear lenticle array 405 has no overall light directing power, and may be considered a Fresnel-like prism array with infinite focal length having short focus negative cylindrical lens surfaces 407 on each prism face. The two linear optical arrays comprising screen 401 thereby in combination form high, narrow virtual apertures 409 on a plane 410 in the observer's space, where the plane is generally parallel to the screen 401. The virtual apertures are uniformly illuminated with well-defined edges since the divergence is determined by the focal length and width of the short focus optical elements.

The lenses 104 are adjusted such that the illuminated images on the image planes 403 are projected straight-ahead as superimposed real images on the screen 401, and the center-to-center spacing of the projectors 402 in the projector array 400 is set to be approximately equal to the width of the virtual apertures 409, typically about 50 millimeters. The focal length of the projector lenses 104 and the width of the multiple perspective view image segments 412 on the illuminated image planes 404 are set such that sight lines from the centers of any two adjacent image segments 420 in each projector 402 reflect from the screen surface and pass through the centers of the corresponding adjacent virtual apertures 409. The result is that the distance between the plane of the screen 400 and the virtual aperture plane is approximately equal to the distance between the screen plane and the projector array 400. It should be noted that the projectors 402 focus to form a real image on the plane of screen 401, not the plane of the virtual apertures 409. An observer looking through the virtual apertures 409 focuses on the plane of screen 401 to see the projected real images.

Figure 13:
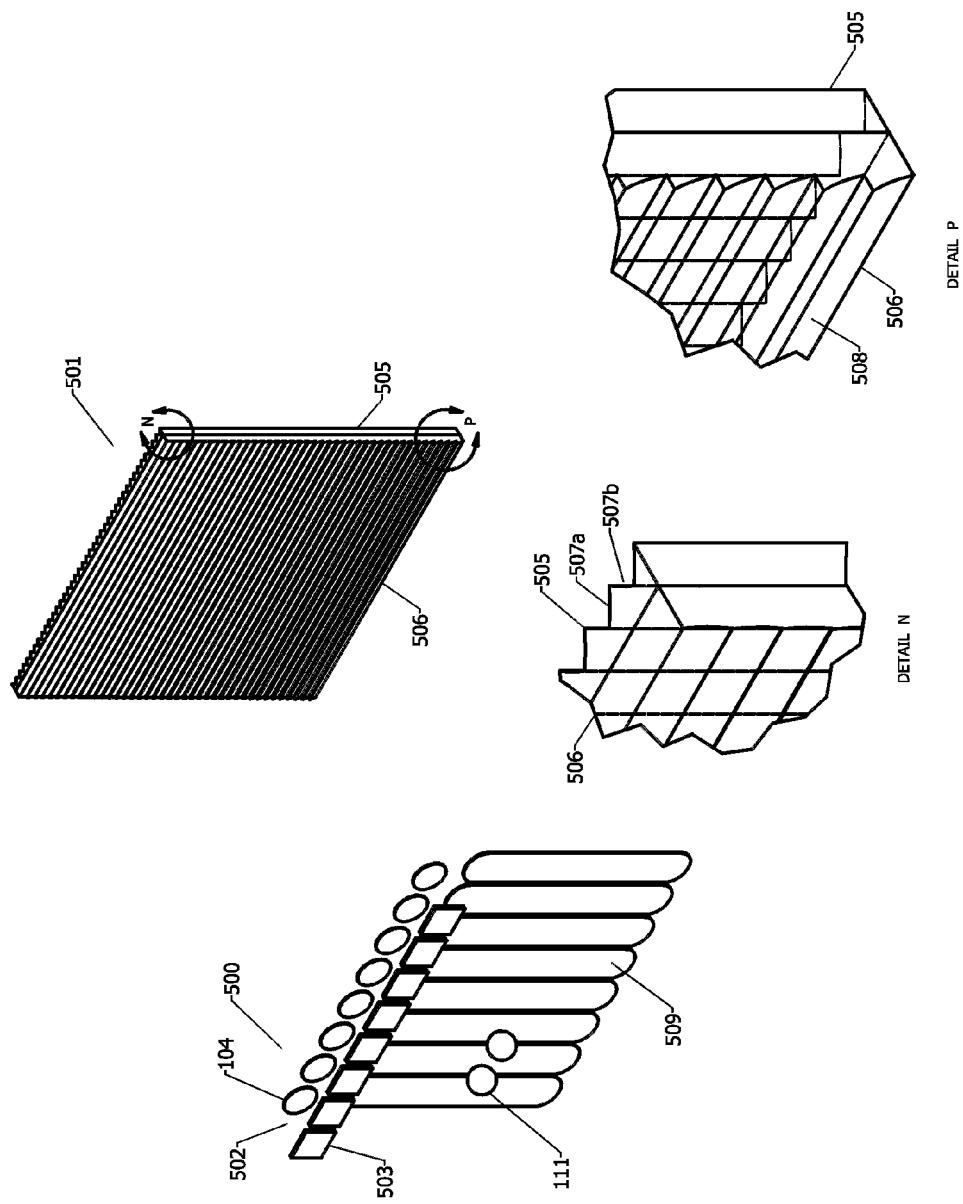
FIG. 13 is a perspective view of the front projection retroreflective integral image application of the autostereoscopic display system.
Figure 14:
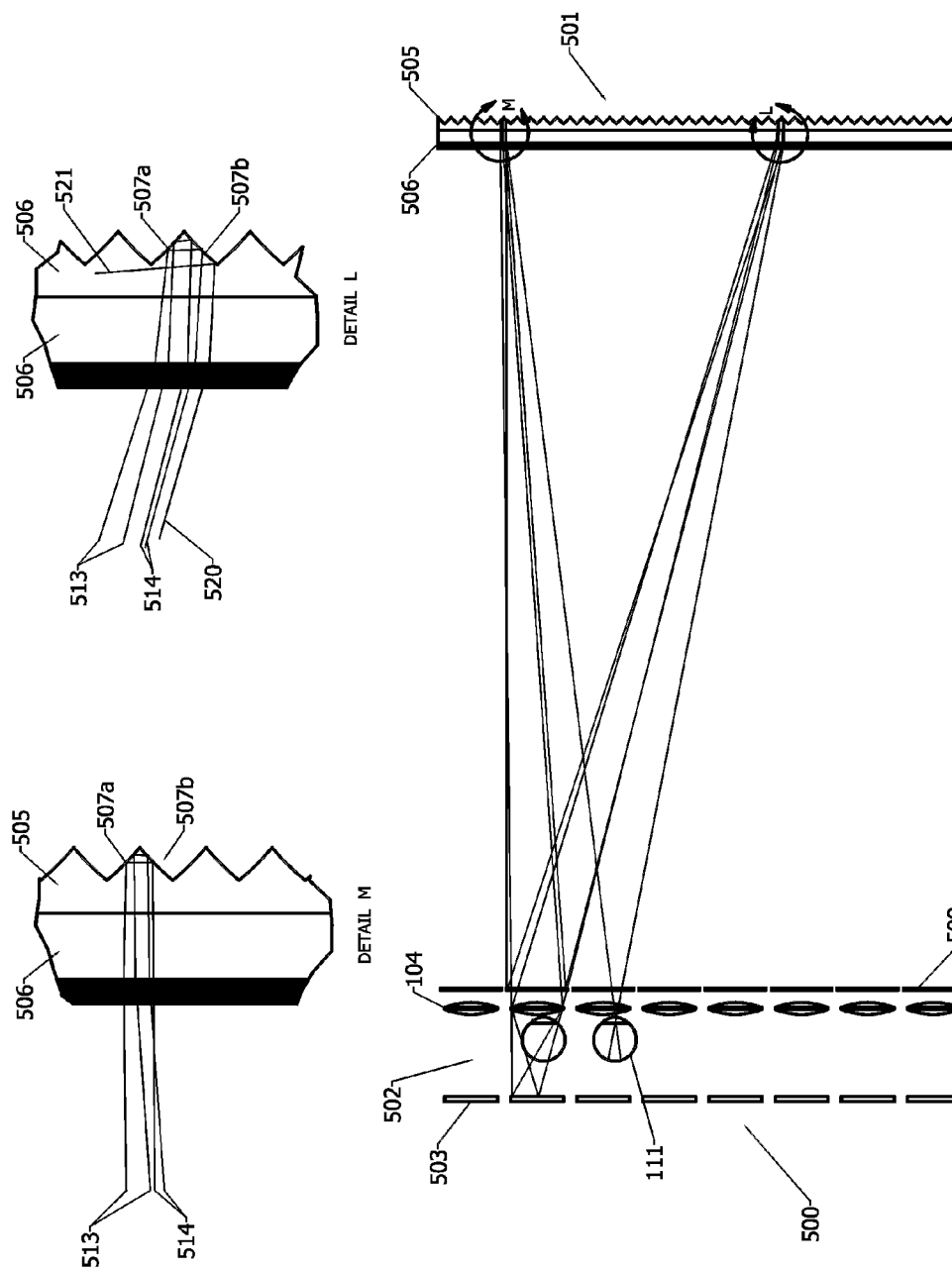
FIG. 14 is a plan view of the front projection retroreflective integral image application of the autostereoscopic display system.
Figure 15:
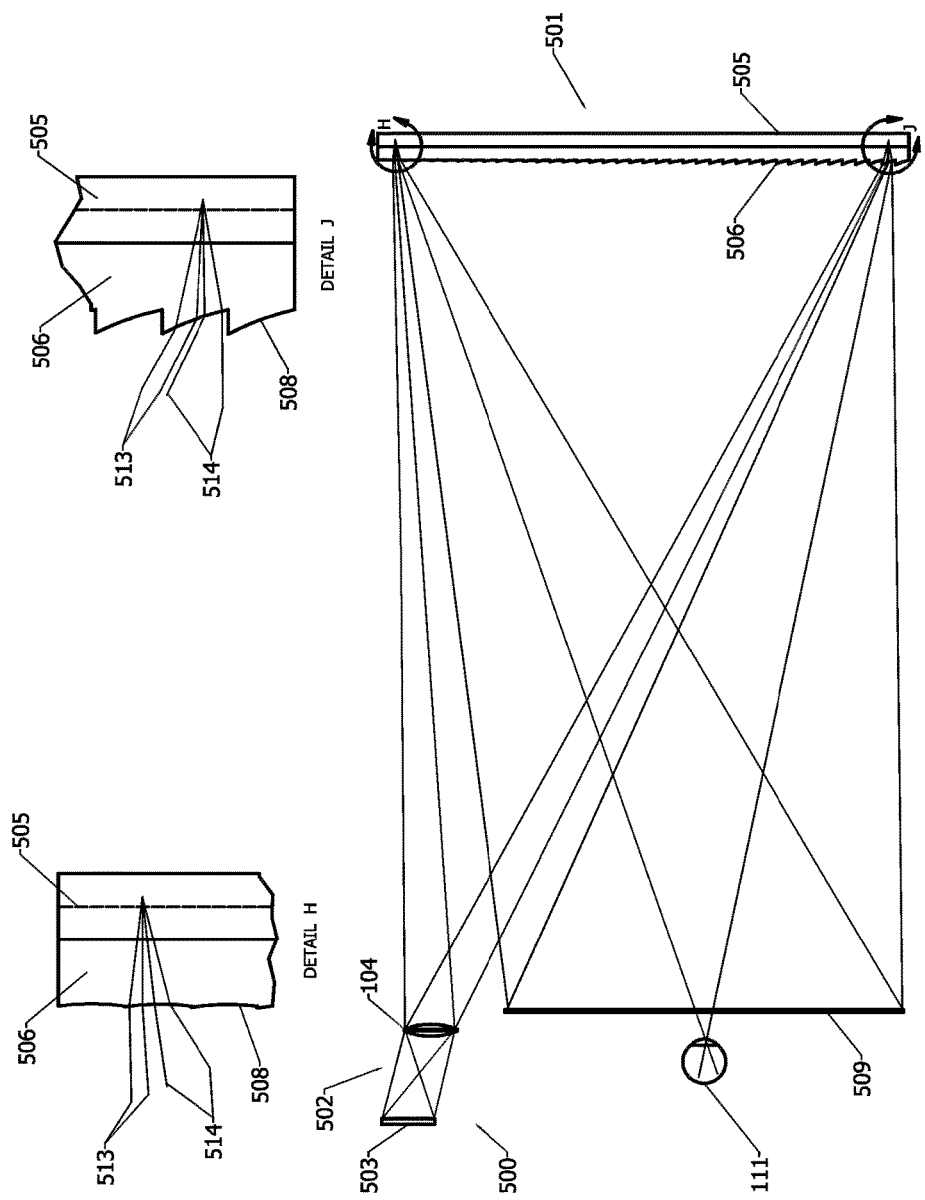
FIG. 15 is a side elevation view of the front projection retroreflective integral image application of the autostereoscopic display system.

A front projection retroreflective integral image application of the invention is shown in FIG. 13, FIG. 14 and FIG. 15. A multiple projector array 500 is positioned in front of an optical screen 501. Each projector 502 comprises an illuminated two dimensional image plane 503 and a projection lens 104. Vertical lens shift is also shown that allows the projector array 500 to be positioned above the observers while maintaining sharp focus and avoiding image distortion. The image planes 503 are coplanar and parallel to the screen 501. Each image plane 503 displays a single integral image of the scene from a different perspective view. The screen 501 is formed of a front horizontal transparent prism array 506 superimposed on a rear vertical retroreflecting prism array 505. The retroreflecting prisms are formed in the rear surface of a transparent sheet, and have right triangular cross sections with the hypotenuse parallel to the plane of the sheet and a pair of mutually perpendicular exterior faces 507a and 507b. These exterior faces have a specular reflective coating, with the effect that most of the incoming light rays 513 entering the front of the array 505 are reflected from exterior faces 507a and 507b and returned as outgoing light rays 514 along the same horizontal paths upon which they entered. This horizontal retroreflection is the opposite of the action of a planar specular mirror, while in the vertical direction the retroreflecting prism array 505 acts as a planar specular mirror. Each exterior face 507a and 507b has a concave rear surface that forms a weak negative short focus cylindrical reflector surface within the retroreflecting prism. The horizontal Fresnel-like prism array 506 directs light toward the center of the virtual apertures 509, wherein each horizontal prism face 508 has a concave surface that forms a strong short focus negative cylindrical lens surface. The optical axis 515 of the reflective horizontal prism array 506 is offset upward to match the position of the projector array 500 above the observers and provide more even brightness of screen 501. Incoming light rays 513 from the projectors 502 converge to a real image focus at the plane of the screen 501 as illustrated in FIG. 14 and FIG. 15. As shown in FIG. 14, the retroflecting prism array 505 directs the horizontal components of the incoming light rays 513 back towards the projector lens 104. At the same time, the relatively weak negative cylindrical reflectors forming exterior faces 507a and 507b of retroflecting prism array 505 spread the incoming light rays 513 so the outgoing light rays 514 diverge horizontally to fill the width of the corresponding virtual aperture 509 but do not change the overall direction of the rays. Similarly as shown in FIG. 15, the angles of the horizontal prism surfaces 508 are set to refract the incoming light rays 513 in the vertical direction to form outgoing light rays 514 directed toward the center of virtual aperture 509 to form real images of the projector exit pupils centered within each the virtual apertures 509, while the relatively strong short focus negative lens surfaces comprising the horizontal prism surfaces 508 expand the divergence of the outgoing light rays in the vertical direction to fill the height of the virtual apertures 509. Screen parameters take account of the fact that the light passes through the horizontal prism surfaces 508 twice and is refracted twice, and is reflected twice from the exterior faces 507a and 507b. The two linear optical arrays comprising screen 501 thereby in combination form high, narrow virtual apertures 509 on a plane in the observer's space, where the plane is generally parallel to the screen 501. The virtual apertures are uniformly illuminated with well-defined edges since the divergence is determined by the focal length and width of the short focus optical elements.

The lenses 104 are adjusted such that the illuminated images on the image planes 503 are projected straight-ahead as superimposed real images on the screen 501. The center-to-center spacing of the projectors 502 in the projector array 500 is set to be approximately equal to the width of the virtual apertures 509, e.g. about 50 millimeters. The retroreflecting prism array 505 deflects and disperses the incoming light rays 513 from a given projector 502 so the horizontal components of the outgoing light rays 514 form an image of the lens exit pupil at the horizontal position of that projector that is enlarged horizontally to illuminate the full width of the virtual aperture 509. The result is that the horizontal position of each virtual aperture 509 coincides with the projector 502 displaying the integral image visible through that virtual aperture, and the distance between the plane of the screen 501 and the plane of the virtual apertures 509 is approximately equal to the distance between the screen plane and the projector array 500. An observer looking through the virtual apertures 509 focuses on the plane of screen 501 to see the projected real images.

The example shown in FIG. 13, FIG. 14 and FIG. 15 shows eight projectors 502, each projecting an integral image of one of eight perspective views. The perspective views shown by each projector 502 are a function of the projector position, and the observer's eye 111 sees the integral view from that projector through the associated virtual aperture 509. This scheme can comprise a minimum of a screen 501 and two projectors 502 and associated views, and can be expanded indefinitely to a large number of projectors and views serving a wide viewing zone. The screens 501 may also be curved in the concave or convex directions and extended to the limit of forming circular display walls. The horizontal extent of the subject image that can be seen from any one position is a function of the angular coverage of the projectors, which is in turn controlled by the off-axis performance of the optics. The retroreflective integral image application of the invention may have advantages compared to composite image applications, since each virtual aperture shows a seamless image rather than an image composed from an array of vertical stripes. Unlike the other applications, it is limited to front projection.

Referring to FIG. 14, it should be noted that a portion of off-axis incoming light rays 520 undergo only a single reflection to form low-angle outgoing rays 521, and could theoretically form stray light that reduces the image contrast. This may not be a practical problem, since low-angle rays 521 are generally directed at a shallow angle to the plane of the screen 501, and have a relatively long path lengths through the transparent screen material compared to the doubly reflected outgoing rays 514 before they reach the screen surface. The path length may be further lengthened by total internal reflections from the screen surfaces resulting from the shallow angle of incidence. Optionally the screen material may be lightly tinted to attenuate the low-angle rays 521 with minimum effect on the doubly reflected rays 513 and 514 that have relatively short path lengths through the screen material.

Figure 16:
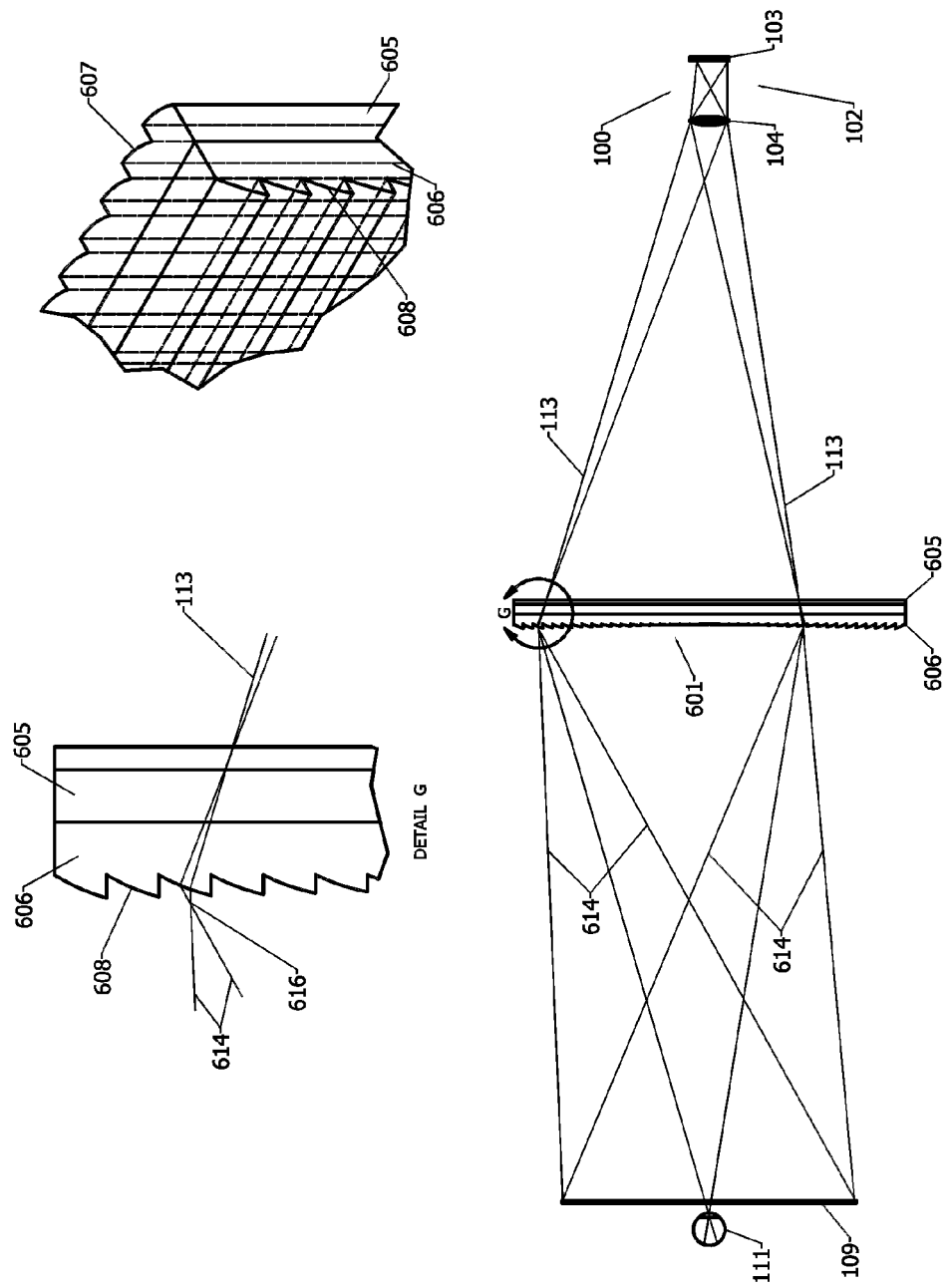
FIG. 16 is a side elevation view of an alternative rear projection integral image application of the autostereoscopic display system employing positive short focus optical elements on the prism faces.

The systems shown in FIG. 1 through FIG. 15 use short negative focus length cylindrical lens surfaces or reflectors on the prism faces expand the light rays to fill the virtual apertures. While these are preferred embodiments, it is also possible to use short positive focus length cylindrical lens surfaces on the prism faces for this purpose. This principle is illustrated in the integral image rear projection system shown in FIG. 16, and is applicable to other integral and composite front and rear projection systems. A multiple projector array 100 is positioned behind an optical screen 601. Each projector 102 comprises an illuminated two dimensional image plane 103 and a projection lens 104. The image planes 103 are coplanar and parallel to the screen 101. The lenses 104 are adjusted such that the illuminated images on the image planes 103 are projected as superimposed real images on the screen 601. The adjustments include positioning the lenses 104 laterally to bring all the real images on screen 101 into register with each other while maintaining sharp focus and avoiding image distortion. The screen 601 is formed of a vertical Fresnel-like prism array 605 superimposed on a horizontal Fresnel-like linear prism array 606, where each vertical prism face 607 and horizontal prism face 608 has a convex surface that forms a positive cylindrical lens surface. The vertical prism surfaces 607 have relatively weak positive focusing strength, and the horizontal prism surfaces 108 have stronger positive focusing strength. The vertical prism array 606 and the horizontal prism array 607 of a screen adapted to integral image systems have similar long cylindrical focal lengths that form real images of the projector exit pupils centered within each virtual aperture 109. Incoming light rays 113 from the projectors 102 converge to a real image focus at the plane of the screen 601. The angles of the horizontal prism surfaces 608 are set to refract the incoming light rays 113 in the vertical direction to form outgoing light rays 614 directed to the center of the corresponding virtual aperture 109, while the relatively strong positive cylindrical lens surfaces comprising the horizontal prism surfaces 608 decrease the divergence of the outgoing light rays 614 in the vertical direction such that the rays cross at a focus 616 near the screen and then diverge to fill the height of the virtual apertures 109. The angles of the vertical prism surfaces 507 act similarly to refract the incoming light rays 113 in the horizontal direction to direct outgoing light rays 514 to fill the width of the virtual apertures 109. The two prism arrays 606 and 607 in combination thereby form high, narrow virtual apertures 109. As with the short focus negative optical elements, the virtual apertures are uniformly illuminated with well-defined edges since the divergence is determined by the focal length and width of the positive short focus optical elements. These positive elements, however, require larger amounts of refraction to fill the virtual apertures than the preferred negative short focus optical elements, potentially increasing chromatic aberrations.

In principle either the horizontal or the vertical prism array can serve as the rear reflective array in front projection screens. In practice, the horizontal reflective rear array 308 of the preceding examples is a preferred embodiment for two reasons. First, reflective optical elements are more affected by dimensional tolerance variations than refractive elements. Screens with horizontal reflective optics controlling the less critical vertical light dispersion, while vertical refractive optics control the more critical horizontal dispersion, have relaxed manufacturing tolerances compared to the alternative arrangement. Second, reflective optical elements do not have the chromatic aberrations of refractive optical elements, so they can provide the large amount of angular dispersion needed to fill the vertical extents of the virtual apertures without color fringing.

The boundary between adjacent virtual apertures should avoid either gaps that cause dark zones or excessive overlap that causes double images that can prove distracting if the observer positions an eye at that point or transitions laterally between virtual apertures. In the inventor's experience a slight amount of overlap between virtual apertures that maintains uniform brightness minimizes such distraction. The inventor also discovered that observers generally adjust their position automatically without conscious thought to maintain a clear view. Known means of adjusting the transitions between virtual apertures include changes in the angular dispersion of the vertical prism array, changes in the size and shape of the projector lens exit pupils and changes in projector position relative to the screen.

This invention comprises a simple and cost effective method of designing and constructing complex optical light directing projection screens. The orthogonal combination of simple linear prism arrays forms an X-Y array containing a large number, e.g. millions, of small optical elements where the prisms cross. Each crossing element has a set of four optical parameters: vertical deflection, horizontal deflection, vertical angular dispersion and horizontal angular dispersion that direct incoming light rays from the projectors to the corresponding virtual apertures. While the superimposed horizontal and vertical Fresnel-like linear prism arrays may be formed on both sides of a sheet in one operation, manufacturing the arrays separately and bonding them together to form complete screens may be preferred. Extrusion or roll forming each side is expected to be particularly cost effective, particularly for large screen sizes. Since the front and rear screen optical arrays are orthogonal, precise alignment of bonded sheets is not needed to provide good performance or avoid moiré patterns. These factors all lead to low screen production cost.

In preferred embodiments the spacing between the prisms in the arrays is less than half the size of the magnified pixels projected on the screen so that the screen does not control the perceived resolution and moiré effects are minimized. Also, the horizontal and vertical prism spacing is not necessarily the same. Further, known methods of enhancing the appearance of Fresnel projection screens may be applied to this invention, e.g. reducing ghost images by tinting the transparent material to attenuate internal reflections.

It will be obvious to those skilled in the art that the vertical linear prism array of this invention may form either the front or rear surface of transmissive rear projection screens, with the horizontal linear prism array on the opposite side with at most a second order change in performance. It is also obvious to separate the front and rear sheets of a screen according to this invention, wherein the space between the sheets is empty or contains other optical elements. Further, it is obvious to combine two or more screens according to this invention to form a compound screen, including putting screens according to this invention in front of a planar mirror such that the assembly acts as a compound front projection screen. Finally, it is obvious to combine one or more screens according to this invention with one or more other optical elements: e.g. diffusers, liner Fresnel lenses or circular Fresnel Lenses.

Finally, it will be obvious to those skilled in the art to apply the principles of this invention to screens displaying images from X-Y projector arrays views differing in both vertical and horizontal perspective such that a X-Y array of virtual apertures are formed that provide changing perspective with both horizontal and vertical changes in the observer's viewpoint.

What is claimed is:

1. A projection screen comprising a vertically oriented generally planar array of linear parallel optical prisms superimposed on a horizontally oriented generally planar array of linear parallel optical prisms, each prism array in aggregate emulating a relatively long focal length cylindrical lens, wherein each prism of each array incorporates an angular face dimensioned to redirect incoming light rays such that the outgoing light rays are directed towards a focal plane, and each angular prism face having a cylindrical cross-section that forms a relatively short focus optical element that changes the angular divergence of the outgoing light rays, the incoming light rays interacting with both the vertical and horizontal prism arrays such that the vertical prism array redirects the light rays in the horizontal direction and the horizontal prism array redirects the light rays in the vertical direction.

2. The projection screen of claim 1 wherein the relatively long focal lengths of the vertical prism array and the horizontal prism array are approximately equal.

3. The projection screen of claim 2 wherein the relatively long focal lengths of the vertical prism array and the horizontal prism array are selected to form projector exit pupil images at the virtual aperture plane in the viewing zone.

4. The projection screen of claim 1 wherein the relatively long focal length of the vertical prism array is infinite and the relatively long focal length of the horizontal prism array is finite.

5. The projection screen of claim 4 wherein the relatively long focal length of the horizontal prism array is selected to form projector exit pupil images at the virtual aperture plane in the viewing zone.

6. The projection screen of claim 1 wherein the cylindrical cross-sections that form the angular prism faces of the vertical prism array produce a different amount of angular divergence than the cylindrical cross-sections that form the angular prism faces of the horizontal prism array.

7. The projection screen of claim 1 wherein the cylindrical cross-section that forms at least one of the angular prism faces is a negative focal length optical element.

8. The projection screen of claim 6 wherein the cylindrical cross-sections that form the angular prism faces of the vertical prism array produce a smaller amount of angular divergence than the cylindrical cross-sections that form the angular prism faces of the horizontal prism array.

9. The projection screen of claim 1 adapted to rear projection wherein the horizontal and vertical prism arrays are translucent and the incoming light rays are redirected by the combined refractive effects of the two prism arrays.

10. The projection screen of claim 1 adapted to front projection wherein the front prism array is translucent and the rear prism array is a specular reflector, and the incoming light rays are redirected by the combined refractive effects of the front prism array and the reflective effects of the rear prism array.

11. The projection screen of claim 3 further comprising a horizontal array of projectors, wherein each projector superimposes an integral perspective view of a scene on the screen, forming separate virtual apertures through which each perspective view is separately visible to an observer.

12. The projection screen and projector array of claim 11 wherein the projector spacing is set to produce virtual aperture spacing less than the interocular spacing of the observers; and
the relatively short focus optical elements on the vertical prism faces are dimensioned to produce less angular divergence of the outgoing light rays than the relatively short focus optical elements on the horizontal prism faces, such that the width of each virtual aperture is less than the height and approximately equal to the virtual aperture spacing, and the height of the virtual apertures accommodates differences in observer eye elevation.

13. The projection screen of claim 5 further comprising a horizontal array of projectors, wherein each projector superimposes composite perspective views of a scene on the screen, forming separate virtual apertures through which each perspective view is separately visible to an observer, wherein an indefinitely large number of projectors may be used to increase display width.

14. The projection screen and projector array of claim 11 wherein the projector spacing is set to produce virtual aperture spacing less than the interocular spacing of the observers; and
the relatively short focus optical elements on the vertical prism faces are dimensioned to produce less angular divergence of the outgoing light rays than the relatively short focus optical elements on the horizontal prism faces, such that the width of each virtual aperture is less than the height and approximately equal to the virtual aperture spacing, and the height of the virtual apertures accommodates differences in observer eye elevation.

15. A front projection screen comprising a generally planar vertically oriented retroreflector forming the rear surface and a horizontally oriented generally planar array of linear parallel optical prisms forming the front surface, and wherein:
the retroreflector comprises a generally planar array of linear parallel optical prisms, each having isosceles right triangular cross sections with the hypotenuse parallel to the plane of the array thereby forming a pair of mutually perpendicular exterior faces, wherein these exterior faces have a specular reflective coating, the prisms in aggregate forming a retroreflector that directs the horizontal component of outgoing light rays back towards the source of the incoming light, and wherein each angular prism face has a cylindrical cross-section that forms a relatively short focus optical element that changes the angular divergence of the outgoing light rays; and
the prism array comprises a generally planar array of linear refractive prisms, the prisms in aggregate emulating a relatively long focal length cylindrical lens, wherein each prism incorporates an angular face dimensioned to refract incoming light rays such that the vertical components of the outgoing light rays are directed towards a focal plane near the source of the incoming light rays, and each angular prism face having a cylindrical cross-section that forms a relatively short focus optical element that changes the angular divergence of the outgoing light rays;
the retroreflector and prism array together comprising a front projection screen that redirects the incoming light rays from a projector focused on the screen by means of the combined refractive effects of the front prism array and the reflective effects of the retroreflector to form outgoing light rays distributed over a virtual aperture in substantially the same plane and horizontal position as the projector.

16. The front projection screen of claim 15 further comprising a horizontal array of projectors, wherein each projector superimposes integral perspective views of a scene on the screen, forming separate virtual apertures through which each perspective view is separately visible to an observer, and wherein an indefinitely large number of projectors may be used to increase display width.

17. The projection screen and projector array of claim 16 wherein the projector spacing is set to produce virtual aperture spacing less than the interocular spacing of the observers; and the relatively short focus optical elements on the vertical retroreflector prism faces are dimensioned to produce less angular divergence of the outgoing light rays than the relatively short focus optical elements on the horizontal prism faces, such that the width of each virtual aperture is less than the height and approximately equal to the virtual aperture spacing, and the height of the virtual apertures accommodates differences in observer eye elevation.

18. The front projection screen of claim 15 wherein the cylindrical cross-section that forms at least one of the angular prism faces is a negative focal length optical element.

* * * * *